(No Model.)

W. N. LOCKWOOD.
LINE REEL.

No. 296,196. Patented Apr. 1, 1884.

Witnesses
H. D. Williams
E. G. Baker

William N. Lockwood
Inventor
per Alfred Sherlock
Atty.

UNITED STATES PATENT OFFICE.

WILLIAM N. LOCKWOOD, OF CAMPVILLE, CONNECTICUT.

LINE-REEL.

SPECIFICATION forming part of Letters Patent No. 296,196, dated April 1, 1884.

Application filed April 17, 1882. (No model.)

*To all whom it may concern:*

Be it known that I, WILLIAM N. LOCKWOOD, of Campville, Litchfield county, State of Connecticut, have invented certain new and useful Improvements in Line-Reels, of which the following is a specification.

This invention has for its object to supply a want long felt by those having occasion to use long lines—such as chalk-lines, &c.—viz., a simple device for holding, paying out, and winding up the same.

This invention consists of a reel inclosed and having bearings in a case composed of two end pieces connected together by means of three rods, and a cylindrical shell open about one-third the circumference, one of the end pieces being formed so as to incase a gear-wheel which meshes into a pinion on the reel-shaft, said gear-wheel having a crank-handle on its shaft, by means of which the reel may be rapidly rotated and the line wound evenly thereon and without kinks. A spring-catch is provided, pivoted to one of the end pieces, and arranged to fall between the spokes or in the openings of one of the flanges of the reel, thereby holding and preventing the same from rotating when sufficient line has been paid out. This spring-catch is conveniently located to be operated by the thumb or one of the fingers of the hand holding the case, while the reel may be rotated by means of the other hand actuating the crank-handle. The whole of the device is made very strong and light, and by use of the same lines for carpenters, masons, and other uses are easier manipulated and better preserved when out of use, as will be fully understood by reference had to the accompanying drawings, in which—

Figure 1:
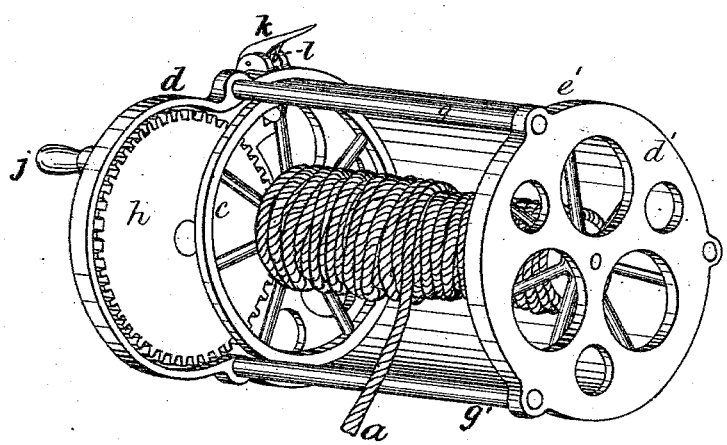
Figure 2:
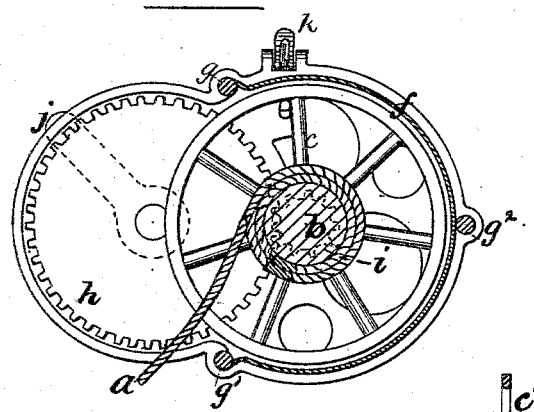
Figure 3:
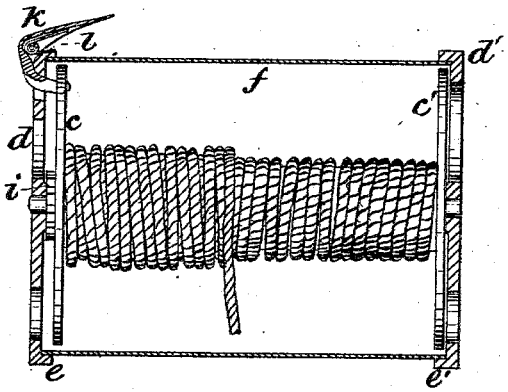
Figure 4:
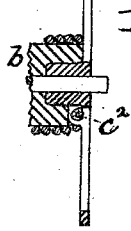

Figure 1 is a perspective view of my improved line-reel. Fig. 2 is a transverse section of the same. Fig. 3 is a longitudinal section of the inclosing-case, showing the reel in full; and Fig. 4 is a part sectional view of the reel, showing the manner in which the end of the line is secured thereto.

The reel or bobbin upon which the line $a$ is wound is composed of a shaft, $b$, and the two metal flanges $c$ and $c'$. These flanges are provided with hubs, which are forced into holes in the ends of the shaft $b$, and central pins are passed through them, forming bearings for the reel in the inclosing-frame. The one $c'$ is also provided with a small lug, $c^2$, having a hole, in which one end of the line $a$ is secured. By fastening the line to a lug on the flange $c'$, instead of directly to the wooden shaft $b$, as heretofore done in this class of devices, all tendency to loosen the shaft from the flange is avoided, as no direct strain is applied to the shaft in winding up the line. The shaft $b$ may be dispensed with and replaced by a rod passed through the flanges $c$ $c'$, to form the bearings of the bobbin.

The case which incloses the reel, and in which it is adapted to rotate by means of the central pins or rod, is composed of the end pieces, $d$ and $d'$, having internal flanges, $e\ e'$, and the sheet-metal shell $f$, formed to surround the reel about two-thirds of the circumference, is held in place by the flanges $e\ e'$ of the end pieces, $d$ $d'$, said end pieces being secured together by means of the three rods $g\ g'\ g^2$, which also assist to retain the shell $f$ in place. A gear-wheel, $h$, is located at the inside of the end piece, $d$, in such position as to mesh into the pinion $i$, secured to the reel or bobbin flange $c$. The shaft of the gear-wheel $h$ passes through a bearing-hole in the end piece, $d$, and is provided with a crank-handle, $j$. The end pieces, $d\ d'$, of the case, as well as the flanges $c\ c'$ of the reel, are of cast metal, and made as light as possible.

Between lugs formed on the end piece, $d$, is pivoted the small bell-crank-shaped catch $k$, formed so that its inner end will pass between the spokes of or into openings of the flange $c$, it being actuated so to do by means of the spring $l$. The outer end of the catch $k$ is arranged, as shown, parallel with the axis of the reel, and close to the cylindrical casing, to be of easy access for manipulation by the thumb or finger of the hand by which the device is held while in use, said thumb or finger pressing the outer end of it toward the casing to release the catch. By depressing this end of the catch $k$ the flange $c$ of the reel is released and the line free to be paid out through the open space between the rods $g\ g'$, and when sufficient of it is out the reel is instantly arrested by freeing the catch $k$ of the thumb or finger. The rewinding of the line $a$ on the shaft $b$ of the bobbin is quickly and uniformly done by holding the catch $k$ away from the flange $c$ and turning the crank-handle $j$.

The teeth of the wheel $h$ are surrounded by the flange $d^2$, formed on the end piece, $d$, so that all danger of the line $a$ being caught is entirely avoided.

By means of this simply and cheaply constructed line-reel, which is adapted for lines for all purposes where it is desired to often pay out and wind up the same during use, such lines are caused to last much longer by being protected, and all trouble due to the kinking of the same avoided, and, further, are kept clean, which is a desideratum with chalk-lines, &c.

Having now described my invention, what I claim, and desire to secure by Letters Patent, is—

1. In a line-reel, the combination, with the shaft $b$, of the plain flange $c$, secured to one end thereof, and the flange $c'$, secured to the other end, and provided with a lug, $c^2$, projecting inwardly therefrom adjacent to the shaft $b$, and to which is attached one end of the line, substantially as and for the purpose hereinbefore set forth.

2. In combination, the inclosing-case $d\ d'\ f$, the gear-wheel $h$, provided with the crank-handle $j$, the line-reel $b\ c\ c'$, provided with the pinion, and the bell-crank spring-catch $k$, having its outer end lying along the inclosing-case, substantially as and for the purpose set forth.

In testimony whereof I have hereunto set my hand this 17th day of March, A. D. 1882.

WILLIAM N. LOCKWOOD.

Witnesses:
JOHN W. SULLIVAN,
GEORGE H. STOUGHTON.